United States Patent
Chung et al.

(10) Patent No.: US 8,503,780 B2
(45) Date of Patent: Aug. 6, 2013

(54) APPARATUS FOR DETECTING TEXT RECOGNITION REGION AND METHOD OF RECOGNIZING TEXT

(75) Inventors: Hee-Jin Chung, Seoul (KR); Kue-Hwan Sihn, Hwaseong-si (KR); Dong-Gun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 12/946,307

(22) Filed: Nov. 15, 2010

(65) Prior Publication Data

US 2011/0158532 A1 Jun. 30, 2011

(30) Foreign Application Priority Data

Dec. 29, 2009 (KR) .................. 10-2009-0133374

(51) Int. Cl.
*G06K 9/34* (2006.01)
(52) U.S. Cl.
USPC .......................................................... 382/176
(58) Field of Classification Search
None
See application file for complete search history.

(56) References Cited

U.S. PATENT DOCUMENTS

| | | | | |
|---|---|---|---|---|
| 6,385,351 B1 * | 5/2002 | Simske et al. | ............... | 382/312 |
| 7,486,821 B2 | 2/2009 | Lim et al. | | |
| 2002/0141641 A1 * | 10/2002 | Zhu | .............................. | 382/170 |
| 2009/0136135 A1 | 5/2009 | Eom et al. | | |
| 2010/0053707 A1 * | 3/2010 | Mori | ............................ | 358/505 |
| 2010/0293460 A1 * | 11/2010 | Budelli | ........................ | 715/702 |

FOREIGN PATENT DOCUMENTS

| | | |
|---|---|---|
| JP | 2002-149662 | 5/2002 |
| JP | 2002-199302 | 7/2002 |
| JP | 2005-004760 | 1/2005 |
| JP | 2007-164253 | 6/2007 |
| KR | 10-2006-0065197 | 6/2006 |
| KR | 10-2008-0099385 | 11/2008 |
| KR | 10-2009-0053177 | 5/2009 |
| WO | WO 2008/140194 | 11/2008 |

* cited by examiner

*Primary Examiner* — Nirav G Patel
(74) *Attorney, Agent, or Firm* — NSIP Law

(57) ABSTRACT

A text recognition region detecting apparatus and a text recognition method are provided. A text recognition region is detected by expanding a region based on a user-specified position that is input through a simple manipulation by a user. A text recognition is performed on the detected text recognition region, thereby relieving a user from having to precisely input the text region and ensuring the user's convenience.

15 Claims, 7 Drawing Sheets

FIG. 2

| CLASSIFICATION | EXAMPLES OF INPUT OF USER-SPECIFIED POSITION |
|---|---|
| DOT | ● |
| LINE | ─ ╱ ╲ |
| SYMBOL | ∨ ∧ |
| FIGURE | ○ △ ▽ |

FIG. 4

MAN

● ◄── USER-SPECIFIED POSITION

WOMAN

← USER-SPECIFIED POSITION

APPARATUS FOR DETECTING TEXT RECOGNITION REGION AND METHOD OF RECOGNIZING TEXT

CROSS-REFERENCE TO RELATED APPLICATION(S)

This application claims the benefit under 35 U.S.C. §119 (a) of Korean Patent Application No. 10-2009-0133374, filed on Dec. 29, 2009, the disclosure of which is incorporated by reference in its entirety for all purposes.

BACKGROUND

1. Field

The following description relates to a technology of recognizing text and more particularly, to a text recognition region detecting apparatus for detecting a region for text recognition and a text recognition method of recognizing a text included in the detected text recognition region.

2. Description of the Related Art

In photographing an image of a text with a mobile device having a camera and recognizing the text from the image, the camera needs to detect the location of the text to be recognized in the image. However, a method of detecting the region of the text with a mobile device having a limited amount of CPU and memory capacity is unreliable in terms of the accuracy and speed. In this regard, it may be preferable to detect the text location in a manner in which a user directly specifies a text region.

Two methods of directly specifying a text region by a user conventionally exist. In one method, when taking a picture of an object by a camera of a mobile device, the position of the camera and zooming operation needs to be adjusted by the user such that a text is positioned within a square region displayed on a screen of the mobile device. In another method, a user specifies a square region for text recognition on a screen displaying an image including the text, which is already taken by a camera provided in a mobile device.

However, the former method requires the user to adjust the position of the camera and zooming operation with precision, complicating the user's manipulation. In this method, the accuracy of specifying the text region significantly influences the final result. Accordingly, unless the position of the camera and zooming operation are precisely adjusted, it is difficult to obtain text recognition.

Meanwhile, according to the latter method, the user's manipulation is easier than the former method. However, the user needs to precisely specify a text recognition region on the screen displaying an image to obtain a desired result of text recognition.

SUMMARY

In one general aspect, there is provided a text recognition region detecting apparatus, the apparatus including: a position detection unit configured to detect a user-specified position, an initial text region detection unit configured to detect an initial text region a predetermined distance from the detected user-specified position, and an overall text region detection unit configured to detect an overall text region by expanding the initial text region.

The apparatus may further include that the position detection unit is further configured to detect the user-specified position by detecting at least one of: a dot, a line, a symbol, a start point, an end point, a middle point, a vertex, and a center point of a figure, which is input through a user's touch operation or a touch and drag operation on a touch screen displaying an image.

The apparatus may further include that the initial text region detection unit is further configured to detect text components by selecting candidate text components and removing non text components from the selected candidate text components.

The apparatus may further include that the initial text region detection unit is further configured to detect candidate text components existing in an overall image and to determine, as the initial text region, a bounding box of at least one text component among text components, which are obtained by removing non-text components from the detected candidate text components, the at least one text component existing within an area a predetermined distance from the user-specified position.

The apparatus may further include that the initial text region detection unit is further configured to detect candidate text components existing within a virtual window having the user-specified position as a center and to determine, as the initial text region, a bounding box of at least one text component among text components, which are obtained by removing non-text components from the detected candidate text components, the at least one text component existing within an area a predetermined distance from the user-specified position.

The apparatus may further include that initial text region detection unit is further configured to detect candidate text components existing within a virtual polygon or virtual looped curve that is formed by at least three points of a start point, an end point, a middle point, a vertex, and a center point of a symbol or a figure, which is detected by the position detection unit and to determine, as the initial text region, a bounding box of at least one text component among text components, which are obtained by removing non-text components from the detected candidate text components, the at least one text component existing within an area a predetermined distance from the user-specified position.

The apparatus may further include that the overall text region detection unit is further configured to detect the overall text region by comparing the similarity of a region based feature between the initial text region and an adjacent region.

The apparatus may further include that the region based feature includes at least one of: a hue histogram, a brightness histogram, and a saturation histogram.

The apparatus may further include that the region based feature includes a previously learned classification feature.

In another general aspect, there is provided a text recognition method, the method including: detecting a user-specified position, detecting an initial text region a predetermined distance from the user-specified position, detecting an overall text region by expanding the initial text region, and recognizing text included in the overall text region.

The method may further include that detecting the user-specified position includes detecting at least one of: a dot, a line, a symbol, a start point, an end point, a middle point, a vertex, and a center point of a figure, which is input through a user's touch operation or a touch and drag operation on a touch screen displaying an image.

The method may further include that detecting the initial text region includes detecting text components by: selecting candidate text components, and removing non-text components from the selected candidate text components.

The method may further include that detecting the initial text region further includes: detecting candidate text components existing in an overall image, and determining the initial text region as a bounding box of at least one text component among text components, which are obtained by removing non-text components from the detected candidate text components, the at least one text component existing within an area a predetermined distance from the user-specified position.

The method may further include that detecting the initial text region further includes: detecting candidate text components, which exist within a virtual window having the user-specified position as a center, and determining the initial text region as a bounding box of at least one text component among text components, which are obtained by removing non-text components from the detected candidate text components, the at least one text component existing within an area a predetermined distance from the user-specified position.

The method may further include that detecting the initial text region further includes: detecting candidate text components, which exist within a virtual polygon or virtual looped curve that is formed by at least three points of a start point, an end point, a middle point, a vertex, and a center point of a symbol or a figure, which is detected by the position detection unit, and determining the initial text region as a bounding box of at least one text component among text components, which are obtained by removing non-text components from the detected candidate text components, the at least one text component existing within an area a predetermined distance from the user-specified position.

The method may further include that the overall text region is detected by comparing the similarity of a region based feature between the initial text region and an adjacent region.

The method may further include that the region based feature includes at least one of: a hue histogram, a brightness histogram, and a saturation histogram.

The method may further include that the region based feature includes a previously learned classification feature.

In another general aspect, there is provided a computer-readable computer storage medium including a program that, when executed, causes a computer to execute a text recognition method, including: detecting a user-specified position, detecting an initial text region a predetermined distance from the user-specified position, detecting an overall text region by expanding the initial text region, and recognizing text included in the overall text region.

Other features and aspects may be apparent from the following detailed description, the drawings, and the claims.

BRIEF DESCRIPTION OF THE DRAWINGS

FIG. 2 shows an example of a dot or a line, a symbol and a figure at least one of which is used to input a user-specified position.

FIG. 4 shows an example in which at least one text is positioned within an area a predetermined distance from a user-specified position.

Figure 1:
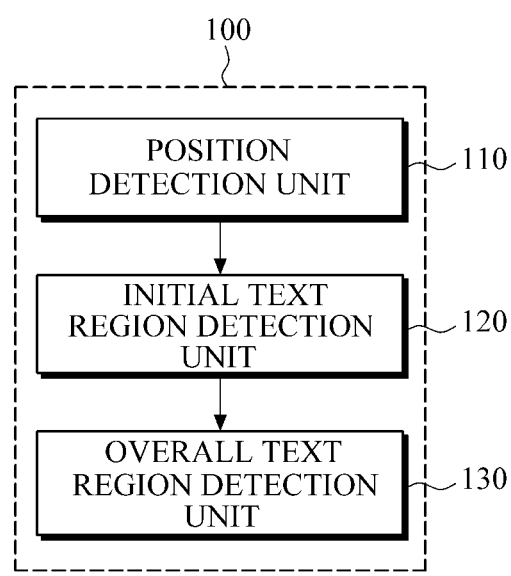
FIG. 1 shows an example of a configuration of a text recognition region detecting apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Hereinafter, examples will be described with reference to accompanying drawings in detail.

FIG. 1 shows an example of a configuration of a text recognition region detecting apparatus. As shown in FIG. 1, a text recognition region detecting apparatus 100 may include a position detection unit 110, an initial text region detection unit 120, and an overall text region detection unit 130.

The position detection unit 110 may detect a user-specified position. The user-specified position may correspond to, e.g., a dot, a line, a symbol, or a start point, an end point, a middle point, a vertex, or a center point of a figure, which may be input, for example, through a user's touch operation or a touch and drag operation on a touch screen displaying an image. FIG. 2 shows an example of a dot, a line, a symbol, and a figure, at least one of which may be used to input a user-specified position. Other symbols and input methods are contemplated, and the list is nonlimiting and non-exhaustive.

The position detection unit 110 may detect the user-specified position by detecting, e.g., a dot, a line, a symbol, or a start point, an end point, a middle point, a vertex, or a center point of a figure, which may be input, for example, through a user's touch operation or a touch and drag operation on a touch screen displaying an image.

The initial text region detection unit 120 may detect an initial text region a predetermined distance from the user-specified position which may be detected by the position detection unit. In one example, the relationship between the user-specified position and the text may be classified into four examples as follows.

Figure 3:
FIG. 3 shows an example in which a text overlaps with a user-specified position.
Figure 4:
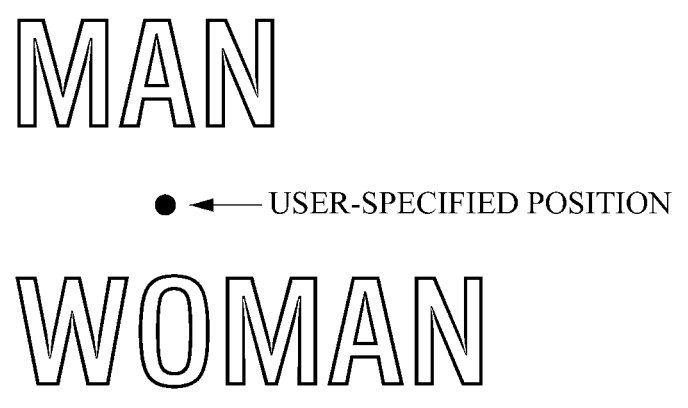
Figure 5:
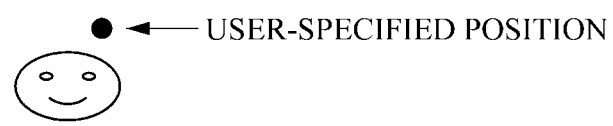
FIG. 5 shows an example in which a non-text component is positioned closer to a user-specified position than a text within an area that is a predetermined distance from a user-specified position.
Figure 6:
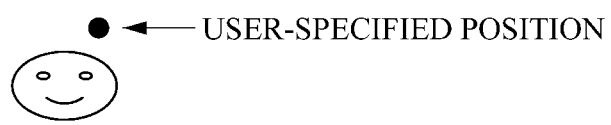
FIG. 6 shows an example in which a text is absent within an area a predetermined distance from a user-specified position.

FIG. 3 shows a first example in which a user-specified position overlaps a text. FIG. 4 shows a second example in which at least one text is positioned within an area that is a predetermined distance from a user-specified position. FIG. 5 shows a third example in which a non-text component is positioned closer to a user-specified position than a text within an area a predetermined distance from a user-specified position. FIG. 6 shows a fourth example in which no text exists within an area a predetermined distance from a user-specified position.

The initial text region detection unit 120 may detect text components by selecting representative text components and removing non-text components from the selected candidate text components. After that, the initial text region detection unit 120 may detect an initial text region from the text components. Examples of a method of detecting an initial text region will be described later in detail.

The overall text region detection unit 130 may detect an overall text region by expanding the initial text region that may be detected by the initial text region detection unit 120. The expansion of the initial text region may indicate that the existence of text regions may be examined in upper/lower/left/right/diagonal directions based on the initial text region. For example, the overall text region may be detected by expanding a region in a text unit by use of a Connected Component Analysis scheme.

In one example, if the expansion range of the region is too large, the amount of calculation to determine a text region may be high, reducing the speed of detection of the overall text region, and if the expansion range of the region is too small, it may be impossible to determine a text region. Accordingly, the expansion region of a region may need to be determined to have a proper proportion with respect to a screen size, for example, a widthwise size of 1/m, and a longitudinal size of 1/n, where m and n are positive integers.

Meanwhile, the overall text detection unit 130 may detect the overall text region by comparing the similarity of a region based feature between the initial text region and a region adjacent to the initial text region in upper/lower/left/right/diagonal directions. For example, the region text may be a hue histogram, a brightness histogram, or a saturation histogram. Alternatively, the region based feature may be an output feature of an edge filter or a stroke filter or a classification feature that is preliminarily learned through a machine learning algorithm such as "Markov Mode" or "Support Vector Machine."

The example of the text recognition region detecting apparatus 100 may detect the user-specified position through the location detection unit 110, may detect the initial text region that is a predetermined distance from the user-specified position through the initial text region detection unit 120, and may detect the overall text region by expanding the initial text region through the overall text region detection unit 130, finally detecting the text recognition region.

A text recognition device (not shown) may perform a text recognition on the overall text region detected by the text recognition region detecting apparatus 100 and then may display the text recognition result. The example of the text recognition region detecting apparatus 100 may be provided as a separate unit from the text recognition device or may be provided as a part of the text recognition device.

As described above, according to the example of the text recognition region detecting apparatus 100, the text recognition region may be detected while expanding a region based on the user-specified position that is input through a simple manipulation by a user. As a result, the user's convenience is ensured.

According to another example of the text recognition region detecting apparatus, the initial text region detection unit 120 may detect candidate text components existing in an overall image and determine, as the initial text region, a bounding box of at least one text component among text components, which may be obtained by removing non-text components from the detected candidate text components, at least one text component existing within an area a predetermined distance from a user-specified position.

The above example may be useful when a deviation in the size of text included in an image is great. According to one example, text components may be detected by analyzing an overall image and the initial text region may be determined as a bounding box of at least one text component among the text component, which may exist within an area a predetermined distance from a user-specified position.

According to another example of the text recognition region detecting apparatus, the initial text region detection unit 120 may detect candidate text components existing within a virtual window having a user-specified position as a center and determine, as the initial text region, a bounding box of at least one text component among text components, which may be obtained by removing non-text components from the detected candidate text components, at least one text component existing within an area a predetermined distance from the user-specified position.

The above example may be useful when a deviation in the size of texts included in an image is small. According to one example, text components may be detected by analyzing an image within a virtual window having a user-specified position as a center and the initial text region may be determined as a bounding box of at least one text component among the text component, which may exist within an area a predetermined distance from the user-specified position. If no text component exists within the virtual window, the virtual window may be expanded to detect the initial text region.

According to another example of the text recognition region detecting apparatus, the initial text region detection unit 120 may detect candidate text components existing within a virtual polygon or looped curve that is formed by at least three points of a start point, an end point, a middle point, a vertex, and a center point of a symbol or a figure and determines, as the initial text region, a bounding box of at least one text component among text components, which may be obtained by removing non-text components from the detected candidate text components, at least one text component existing within an area a predetermined distance from the user-specified position.

The above example may be useful when a symbol or a figure capable of providing at least three points is input as the user-specified position input. Text components may be detected by analyzing an image within a virtual polygon or a looped curve that is formed by at least three points and by determining as the initial text region a bounding box of at least one text component among the text components, which may exist within an area a predetermined distance from the user-specified position. In one example, if no text component exists in the virtual polygon or looped curve that is formed by the three points, the virtual polygon or looped curve is expanded to detect the initial text region.

Meanwhile, the distance between the user-specified position and the text component may be calculated based on the distance between the center point of a bounding box of the text component and, e.g., a dot, a line, a symbol, or a start point, an end point, a middle point, a vertex, or a center point of a figure, which may be input as the user-specified position.

Figure 7:
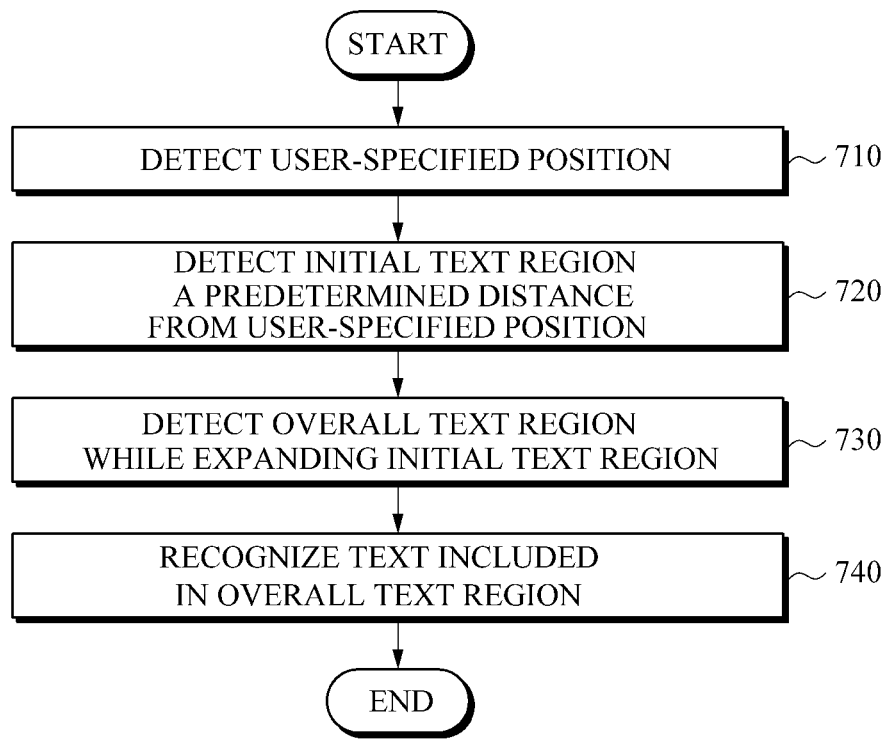
FIG. 7 shows an example of a text recognition method.

FIG. 7 shows an example of a text recognition method. For example, it may be presumed that a user photographs an image for text recognition by use of a mobile device having a camera. In operation 710, if a user inputs a user-specified position in a state that an image is being displayed on a touch screen of the mobile device, the mobile device may detect the user-specified position.

In one example, the user-specified position may be a dot, a line, a symbol, or a start point, an end point, a middle point, a vertex, or a center point of a figure, which may be input through a user's touch operation or a touch and drag operation on a touch screen displaying an image.

In operation 710, the mobile device may detect the user-specified position by detecting a dot, a line, a symbol, or a start point, an end point, a middle point, a vertex or a center point of a figure, which is input through a user's touch operation or a touch and drag operation on a touch screen displaying an image.

In operation 720, the mobile device may detect the initial text region that is a predetermined distance from the detected user-specified position, which may be detected in operation 710.

In operation 720, the mobile device detects text components by selecting candidate text components and removing non-text components from the selected candidate text components, and then detects the initial text region based on the text components.

In operation 730, the mobile device may detect an overall text region by expanding the initial text region that is detected in operation 720.

The expansion of the initial text region may indicate that the existence of text regions is examined in upper/lower/left/right/diagonal directions based on the initial text region. For example, the overall text region may be detected by expanding a region in a text unit by use of a Connected Component Analysis scheme.

In one example, if the expansion range of region is too large, the amount of calculation to determine a text region may be high, reducing the speed of detection of the overall text region. If the expansion range of region is too small, it may be impossible to determine a text region. Accordingly, the expansion region of a region may need to be determined to have a proper proportion with respect to a screen size, for example, a widthwise size of 1/m, and a longitudinal size of 1/n, where m and n are positive integers.

Meanwhile, in operation 730, the overall text region may be detected by comparing the similarity of a region based feature between the initial text region and a region adjacent to the initial text region in upper/lower/left/right/diagonal directions. For example, the region text may be a hue histogram, a brightness histogram, or a saturation histogram. Alternatively, the region based feature may be an output feature of an edge filter or a stroke filter or a classification feature that is preliminarily learned through a machine learning algorithm such as "Markov Model" or "Support Vector Machine."

In operation 740, the mobile device may recognize texts included in the overall text region detected through operation 730. In this manner, according to the example of the text recognition method, texts may be recognized from an image by detecting the user-specified position, detecting the initial text region a predetermined distance from the user-specified position, detecting the overall text region by expanding the initial text region, and finally detecting texts included in the overall text region.

As described above, according to the example of the text recognition region detecting method, the text recognition region may be detected while expanding a region based on the user-specified position that is input through a simple manipulation by a user. As a result, the user's convenience may be better ensured.

According to another example of the text recognition region detecting method, in operation 720, candidate text components existing on an overall image may be detected and determined as the initial text region in a bounding box of at least one text component among text components, which may be obtained by removing non-text components from the detected candidate text components, at least one text component existing within an area a predetermined distance from a user-specified position.

The above example may be useful when a deviation in the size of texts included in an image is great. According to one example, text components may be detected by analyzing an overall image and the initial text region may be determined as a bounding box of at least one text component among the text component, which may exist within an area a predetermined distance from a user-specified position.

According to another example of the text recognition region detecting method, in operation 720, candidate text components existing within a virtual window having a user-specified position as a center may be detected and determined as the initial text region in a bounding box of at least one text component among text components, which may be obtained by removing non-text components from the detected candidate text components, at least one text component existing within an area a predetermined distance from the user-specified position.

The above example may be useful when a deviation in the size of text included in an image is not significant. According to this example, text components may be detected by analyzing an image within a virtual window having a user-specified position as a center and the initial text region may be determined as a bounding box of at least one text component among the text component, which may exist within an area a predetermined distance from the user-specified position. If no text component exists in the virtual window, the virtual window may be expanded to detect the initial text region.

According to another example of the text recognition region detecting method, in operation 720, candidate text components may be detected which exist within a virtual polygon or a looped curve that is formed by at least three points of a start point, an end point, a middle point, a vertex, and a center point of a symbol or a figure, and may be determined as the initial text region in a bounding box of at least one text component among text components, which may be obtained by removing non-text components from the detected candidate text components, at least one text component existing within an area a predetermined distance from the user-specified position.

The above example may be useful when a symbol or a figure capable of providing at least three points is input as the user-specified position input. Text components may be detected by analyzing an image within a virtual polygon or a looped curve that is formed by at least three points and determined as the initial text region in a bounding box of at least one text component among the text components, which may exist in an area a predetermined distance from the user-specified position. In one example, if no text component exists in the virtual polygon or looped curve that is formed by the three points, the virtual polygon or looped curve is expanded to detect the initial text region.

Meanwhile, the distance between the user-specified position and the text component may be calculated based on the distance between, e.g., a dot, a line, a symbol, or a start point, an end point, a middle point, a vertex, or a center point of a figure, which may be input as the user-specified position and the center point of a bounding box of the text component.

As described above, the text recognition region detecting apparatus may detect the text recognition region while expanding a region based on the user-specified position that may be input through a simple manipulation by a user, relieving a user from having to precisely input the text region and better ensuring the user's convenience.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A text recognition region detecting apparatus, the apparatus comprising:
   a position detection unit configured to detect a user-specified position;
   an initial text region detection unit configured to detect an initial text region within a predetermined distance from the detected user-specified position; and
   an overall text region detection unit configured to detect an overall text region by expanding the initial text region, wherein
   the initial text region detection unit is further configured to detect candidate text components existing within a virtual window having the user-specified position as a center and to determine, as the initial text region, a bounding box of at least one text component among text components, which are obtained by removing non-text components from the detected candidate text components, the at least one text component existing within an area a predetermined distance from the user-specified position.

2. The apparatus of claim 1, wherein the position detection unit is further configured to detect the user-specified position by detecting at least one of: a dot, a line, a symbol, a start point, an end point, a middle point, a vertex, and a center point of a figure, any of which is input through a user's touch operation or a touch and drag operation on a touch screen displaying an image.

3. The apparatus of claim 1, wherein the overall text region detection unit is further configured to detect the overall text region by comparing the similarity of a region based feature between the initial text region and an adjacent region.

4. The apparatus of claim 3, wherein the region based feature comprises at least one of: a hue histogram, a brightness histogram, and a saturation histogram.

5. The apparatus of claim 3, wherein the region based feature comprises a previously learned classification feature.

6. A text recognition region detecting apparatus comprising:
   a position detection unit configured to detect a user-specified position;
   an initial text region detection unit configured to detect an initial text region within a predetermined distance from the detected user-specified position; and
   an overall text region detection unit configured to detect an overall text region by expanding the initial text region, wherein
   the initial text region detection unit is further configured to detect candidate text components existing in an overall image and to determine, as the initial text region, a bounding box of at least one text component among text components, which are obtained by removing non-text components from the detected candidate text components, the at least one text component existing within an area a predetermined distance from the user-specified position.

7. A text recognition region detecting apparatus comprising:
   a position detection unit configured to detect a user-specified position;
   an initial text region detection unit configured to detect an initial text region within a predetermined distance from the detected user-specified position; and
   an overall text region detection unit configured to detect an overall text region by expanding the initial text region, wherein
   the initial text region detection unit is further configured to detect candidate text components existing within a virtual polygon or virtual looped curve that is formed by at least three points of a start point, an end point, a middle point, a vertex, and a center point of a symbol or a figure, which is detected by the position detection unit, and to determine, as the initial text region, a bounding box of at least one text component among text components, which are obtained by removing non-text components from the detected candidate text components, the at least one text component existing within an area a predetermined distance from the user-specified position.

8. A text recognition method, the method comprising:
   detecting a user-specified position;
   detecting an initial text region within a predetermined distance from the user-specified position;
   detecting an overall text region by expanding the initial text region; and
   recognizing text included in the overall text region, wherein
   detecting the initial text region further comprises:
      detecting candidate text components, which exist within a virtual window having the user-specified position as a center; and
      determining the initial text region as a bounding box of at least one text component among text components, which are obtained by removing non-text components from the detected candidate text components, the at least one text component existing within an area a predetermined distance from the user-specified position.

9. The method of claim 8, wherein detecting the user-specified position comprises detecting at least one of: a dot, a line, a symbol, a start point, an end point, a middle point, a vertex, and a center point of a figure, any of which is input through a user's touch operation or a touch and drag operation on a touch screen displaying an image.

10. The method of claim 8, wherein the overall text region is detected by comparing the similarity of a region based feature between the initial text region and an adjacent region.

11. The method of claim 10, wherein the region based feature comprises at least one of: a hue histogram, a brightness histogram, and a saturation histogram.

12. The method of claim 10, wherein the region based feature comprises a previously learned classification feature.

13. A text recognition method comprising:
   detecting a user-specified position;
   detecting an initial text region within a predetermined distance from the user-specified position;
   detecting an overall text region by expanding the initial text region; and
   recognizing text included in the overall text region, wherein
   detecting the initial text region further comprises:
      detecting candidate text components existing in an overall image; and
      determining the initial text region as a bounding box of at least one text component among text components, which are obtained by removing non-text components from the detected candidate text components, the at least one text component existing within an area a predetermined distance from the user-specified position.

14. A text recognition method comprising:
   detecting a user-specified position;
   detecting an initial text region within a predetermined distance from the user-specified position;

detecting an overall text region by expanding the initial text region; and recognizing text included in the overall text region, wherein detecting the initial text region further comprises:

detecting candidate text components, which exist within a virtual polygon or virtual looped curve that is formed by at least three points of a start point, an end point, a middle point, a vertex, and a center point of a symbol or a figure, which is detected by the position detection unit; and determining the initial text region as a bounding box of at least one text component among text components, which are obtained by removing non-text components from the detected candidate text components, the at least one text component existing within an area a predetermined distance from the user-specified position.

15. A non-transitory computer-readable computer storage medium comprising a program that, when executed, causes a computer to execute a text recognition method, comprising:

detecting a user-specified position;

detecting an initial text region within a predetermined distance from the user-specified position;

detecting an overall text region by expanding the initial text region; and recognizing text included in the overall text region, wherein detecting the initial text region further comprises:

detecting candidate text components, which exist within a virtual window having the user-specified position as a center; and determining the initial text region as a bounding box of at least one text component among text components, which are obtained by removing non-text components from the detected candidate text components, the at least one text component existing within an area a predetermined distance from the user-specified position.

* * * * *